United States Patent [19]
Christie

[11] Patent Number: 6,014,739
[45] Date of Patent: Jan. 11, 2000

[54] INCREASING GENERAL REGISTERS IN X86 PROCESSORS

[75] Inventor: David S. Christie, Austin, Tex.

[73] Assignee: Advanced Micro Devices, Inc., Sunnyvale, Calif.

[21] Appl. No.: 08/957,900

[22] Filed: Oct. 27, 1997

[51] Int. Cl.$^7$ ........................................................ G06F 9/30
[52] U.S. Cl. ............................................ 712/228; 712/229
[58] Field of Search ...................................... 395/569, 570; 712/228, 229

[56] References Cited

U.S. PATENT DOCUMENTS

| | | | |
|---|---|---|---|
| 5,481,684 | 1/1996 | Richter et al. | |
| 5,651,125 | 7/1997 | Witt | 712/218 |
| 5,689,672 | 11/1997 | Witt | 712/213 |
| 5,809,273 | 9/1998 | Favor | 712/210 |
| 5,822,778 | 10/1998 | Dutton | 711/208 |
| 5,905,900 | 5/1999 | Combs | 713/320 |

OTHER PUBLICATIONS

U.S. Patent Application No. 08/886,421 filed Jul. 1, 1997.
Intel, "Intel 486DX Microprocessor Data Book", pp. 165–169, 148, Jun. 1991.
Intel, "Intel 486DX Microprocessor Data Book", pp. 148, and 165–169, Jun. 1991.

Primary Examiner—Meng-Ai T. An
Assistant Examiner—Stacy Whitmore
Attorney, Agent, or Firm—Conley, Rose & Tayon, PC; Lawrence J. Merkel

[57] ABSTRACT

A microprocessor in which a register file of the microprocessor includes a standard register set and an extension register set. The extension register set is available on an instruction-by-instruction basis based on the contents of an extension register key field of the microprocessor instruction. In one embodiment, the instruction set is compliant with an X86 type instruction set in all cases when the extension register key field is not equal to an extension register key value. A microprocessor comprises a register file and an instruction decode circuit. The register file includes a standard register set comprising a plurality of standard registers and an extension register set comprising a plurality of extension registers. The instruction decode circuit is adapted to receive a microprocessor instruction that includes an extension register key field. If the contents of the extension register key field is equal to an extension register key value, then the instruction decode circuit is configured to access the contents of a selected extension register of the extension register set in response to receiving the microprocessor instruction. If, on the other hand, the contents of the extension register key field equal a value other than the extension register key value, then the instruction decode circuit is configured to access the contents of a selected standard register of the standard register set in response to receiving the microprocessor instruction.

20 Claims, 6 Drawing Sheets

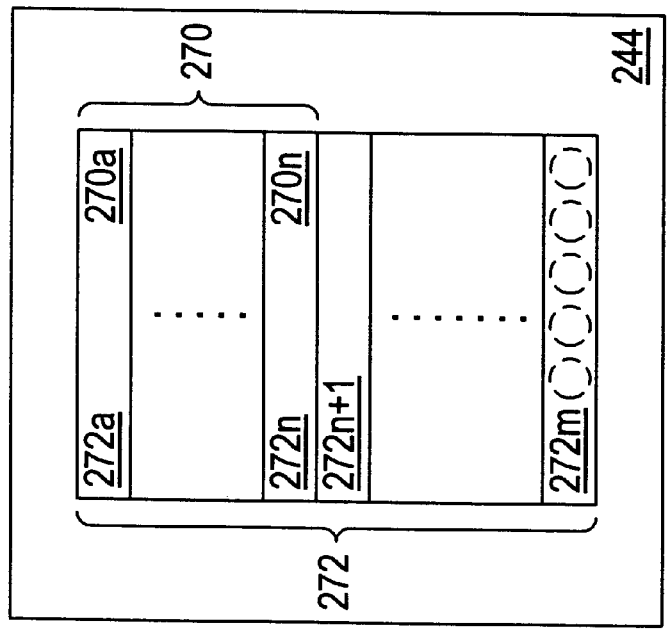
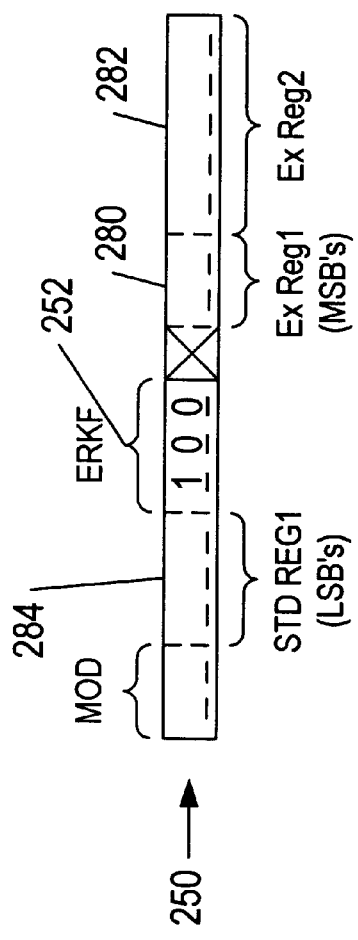
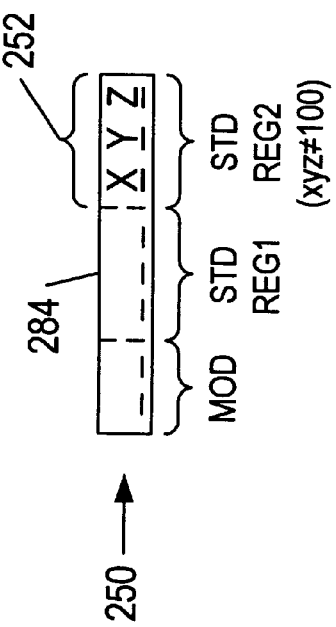
FIG. 7c
FIG. 7a
FIG. 7b

INCREASING GENERAL REGISTERS IN X86 PROCESSORS

BACKGROUND OF THE INVENTION

1. Field of the Invention

This invention relates to microprocessors and more particularly to mechanisms for expanding register address space within an existing microprocessor architecture.

2. Description of the Relevant Art

Microprocessor manufacturers continue to develop new products which execute x86 instructions in order to maintain compatibility with the vast amount of software developed for previous 80x86 generations—the 8086/8, 80286, 80386, and 80486. Maintaining software compatibility has forced many architectural compromises in newer products. In order to retain the functions of earlier products, hardware has often been simply modified or extended in order to increase capability and performance.

The x86 instruction set is relatively complex and is characterized by a plurality of variable byte length instructions. A generic format illustrative of the x86 instruction set is shown in FIG. 1. As illustrated in the figure, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat a string operation a number of times. The opcode field 104 follows the prefix bytes 102, if any, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field of the SIB byte specifies which register contains the base value for the address calculation and an index field specifies which register contains the index value. A scale field specifies the power of two by which the index value will be multiplied before being added, along with any displacement, to the base value. The next instruction field is the optional displacement field 110, which may be from one to four bytes in length. The displacement field 110 contains a constant used in address calculations. The optional immediate field 112, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

FIGS. 2 and 3 illustrate the internal fields associated with the Mod R/M byte and of the SIB byte, respectively. References to a particular register of the x86 architecture may appear within the REG/OP or the R/M field of the Mod R/M byte, or within the index field and base field of the SIB byte. (A register address may alternatively be implied by an opcode.) Thus, there are four possible references to a register in an x86 instruction (although only three register references may appear in any particular instruction). The REG/OP and R/M fields in the Mod R/M byte can specify the source and destination registers, and the base and index fields in the SIB byte can specify the base and index registers used in operand address calculations for memory accesses.

A significant deficiency of the x86 architecture is the small number of general purpose registers. Typical RISC processors have at least thirty-two general purpose registers, as opposed to eight for the x86. A larger register set allows more operands to be stored in the faster-access register file, rather than in relatively slow memory. Modern compilers are also able to take advantage of a larger number of registers to expose greater instruction level parallelism for increased superscalar execution performance. In addition to the limited number of x86 registers, use of them by the compiler is complicated by the fact that most have special implicit uses in various instructions. Expanding the number of registers would alleviate these limitations.

SUMMARY OF THE INVENTION

The problems identified above are in large part addressed by a microprocessor in which a register file of the microprocessor includes a standard register set and an extension register set. The extension register set is available on an instruction-by-instruction basis based on the contents of an extension register key field of the microprocessor instruction. In one embodiment, the instruction set is compliant with an x86 type instruction set in all cases when the extension register key field is not equal to an extension register key value.

Broadly speaking, the present invention contemplates a microprocessor comprising a register file and an instruction decode circuit. The register file includes a standard register set comprising a plurality of standard registers and an extension register set comprising a plurality of extension registers. The instruction decode circuit is adapted to receive a microprocessor instruction that includes an extension register key field. If the contents of the extension register key field is equal to an extension register key value, then the instruction decode circuit is configured to access the contents of a selected extension register of the extension register set in response to receiving the microprocessor instruction. If, on the other hand, the contents of the extension register key field equal a value other than the extension register key value, then the instruction decode circuit is configured to access the contents of a selected standard register of the standard register set in response to receiving the microprocessor instruction.

In one embodiment, the length of the microprocessor instruction is variable and the microprocessor is configured to interpret variable length microprocessor instructions. In one embodiment, the extension register key field of the microprocessor instruction serves as a standard register field if the extension register key field contains a value other than the extension register key value. In this embodiment, the instruction decode circuit is configured to use the contents of the standard register field to select the selected standard register. In a presently prefered embodiment, the instruction decode unit selects the selected standard register by indexing said standard register set according to the contents of the standard register field. In one embodiment, the microprocessor instruction further includes an extension register field when the value of the extension register key field equals the extension register key value. In this embodiment, the instruction decode unit is configured to use the contents of the extension register field to select the selected extension register. In one embodiment, the instruction decode unit selects the selected extension register by indexing the extension register set according to the contents of the extension register field.

The present invention further contemplates a microprocessor comprising a register file and an instruction decode unit. The register file includes a standard register set comprising a plurality of standard registers and an extension register set comprising a plurality of extension registers. The instruction decode unit is adapted to receive a microprocessor instruction. The microprocessor instruction includes operating mode information indicative of whether the instruction decode unit is operating in a standard register mode or an extension register mode. The microprocessor instruction further includes first and second register references indicative of first and second selected registers respectively. The instruction decode unit is further configured to access the contents of the first and second selected registers in response to receiving the microprocessor instruction. The first and second selected registers are located within the standard register set when the instruction decode unit is operating in a standard register mode and are located within the extension register set when the instruction decode unit is operating in an extension register mode. Preferably the operating mode information is contained in an extension register key field of the microprocessor instruction. The instruction decode unit is configured to operate in the extension register mode if the contents of the extension register key field are equal to an extension register key value. In one embodiment, the contents of the extension register key field comprise the second register reference when the contents of the extension register key field are not equal to the extension register key value. In one embodiment, the microprocessor instruction further includes first and second extension register fields when the instruction decode unit is operating in the extension register mode. In this embodiment, the instruction decode unit uses the first and second extension register fields to select the first and second selected registers. When the instruction decode unit is operating in the extension register mode, one embodiment of the present invention uses the first extension register field and a first standard register field of the microprocessor instruction to select the first selected register. In one preferred embodiment, the instruction decode unit concatenates the first extension register field with the first standard register field to form a concatenated register field. The contents of the first extension register form the most significant bits of the concatenated register reference while the contents of the first standard register field form the least significant bits of the concatenated register reference. The instruction decode unit selects the first selected register by indexing the extension register set according to the concatenated register reference. In one embodiment of the present invention, the standard register set is a subset of the extension register set such that the extension register set comprises the standard register set.

The present invention still further contemplates a microprocessor comprising a register file and instruction decode unit. In this embodiment, the instruction decode unit is adapted to receive a microprocessor instruction and an extension register signal. The microprocessor instruction includes operating mode information indicative of whether the instruction decode unit is operating in a standard register mode or an extension register mode. The microprocessor instruction further includes first and second register references indicative of first and second selected registers selectively. The instruction decode unit is further configured to access the contents of the first and second selected registers in response to receiving the microprocessor instruction. In addition, the instruction decode unit accesses the contents of the first and second selected registers from the standard register set when (a) the extension register signal is in a first state or (b) the instruction decode unit is operating in a standard register mode. The instruction decode unit accesses the contents of the first and second selected registers from the extension register set when (a) the instruction decode unit is operating in the extension register mode and (b) the extension register signal is in a second state. Typically, the operating mode information includes an extension register key field of the microprocessor instruction. The instruction decode unit is configured to operate in the extension register mode if the contents of the extension register key field equal an extension register key value. The contents of the first extension register key field comprise the second register reference when the contents of the extension register key field are not equal to the extension register key value. In one embodiment, the microprocessor instruction further includes first and second extension register fields when the instruction decode unit is operating in the extension register mode. In addition, the instruction decode unit uses the first and second extension register fields to select the first and second selected registers.

The present invention still further contemplates a method of decoding computer instructions. First, a microprocessor instruction is received by the microprocessor. The microprocessor instruction includes an extension register key field. A register file from an extension register set of the register file is selected in response to receiving the microprocessor instruction if the extension register key field contains an extension register key value. A register from a standard register set of a register field is selected in response to receiving the microprocessor instruction if the extension register key field contains a value other than the extension register key value. Thereafter, the contents of the selected register are accessed by the microprocessor instruction decode unit and made available for the execution unit. In one embodiment, the step of selecting the register from the extension register set includes the process of indexing the extension register set according to an extension register field of the microprocessor instruction. The step of selecting the register from the standard register set comprises indexing the standard register set according to a standard register field of the microprocessor instruction. In one embodiment, the standard register field comprises the extension register key field when the value of the extension register key field contains a value other than the extension register key value.

BRIEF DESCRIPTION OF THE DRAWINGS

Other objects and advantages of the invention will become apparent upon reading the following detailed description and upon reference to the accompanying drawings in which:

FIGS. 7a and 7b are diagrams of microprocessor instructions suitable for use with the present invention;

FIG. 7c is a block diagram of an alternative embodiment of the file register shown in FIG. 6;

Figure 1:
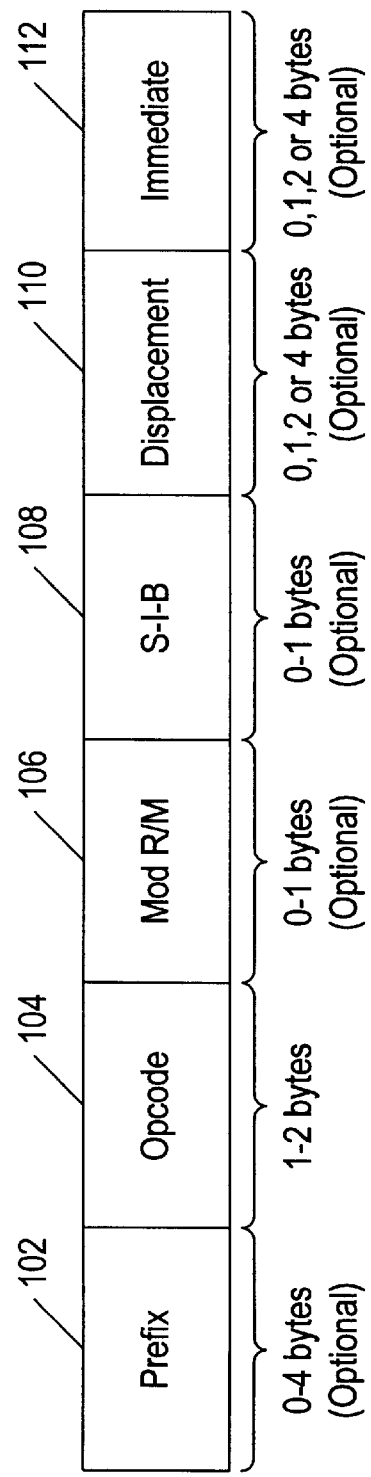
FIG. 1 is a diagram which illustrates the format for x86 instructions.
Figure 2:
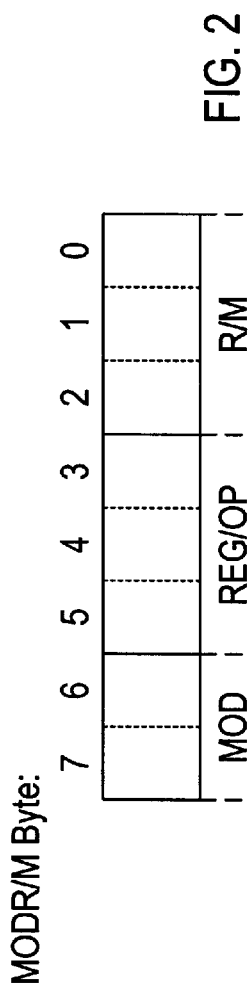
FIG. 2 is a diagram which illustrates the format of a Mod R/M byte of an x86 instruction.
Figure 3:
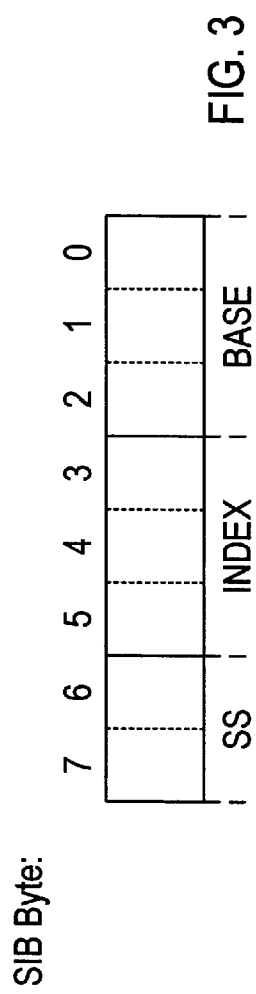
FIG. 3 is a diagram that illustrates the format of the SIB byte.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 4:
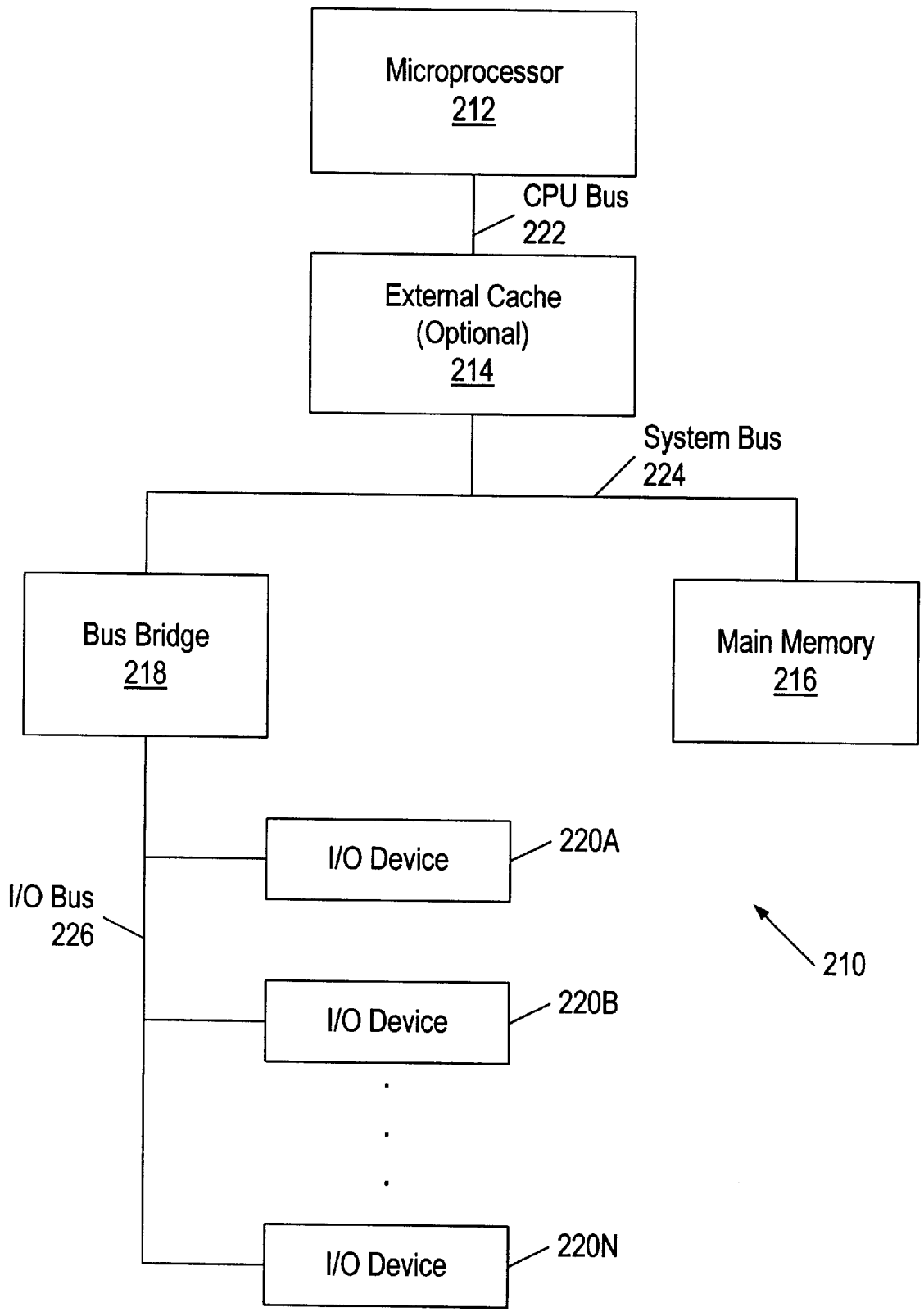
FIG. 4 is a block diagram of a computer system including an extended register set microprocessor employing a mechanism and method to increase register space in accordance with the present invention.

Turning now to FIG. 4, a block diagram of one embodiment of a computer system 210 including an extended register set microprocessor 212 according to the present invention, an external cache 214, a main memory 216, a bus bridge 218, and a plurality of input/output (I/O) devices 220A–220N (collectively referred to as I/O devices 220) is shown. Microprocessor 212 is coupled via a CPU bus 222 to optional external cache 214. External cache 214 is coupled via a system bus 224 to main memory 216 and bus bridge 218. Bus bridge 218 is coupled to I/O devices 220 via an I/O bus 226.

Before discussing specific details regarding features of the present invention, the units of extended register set microprocessor 212 will be described. Generally speaking, microprocessor 212 fetches (or transfers) instructions from main memory 216 and executes the instructions. Data stored in main memory 216 may be operated upon by the instructions. Instructions and data reside at addresses within main memory, wherein an address is a value which identifies a storage location or locations within main memory 216. The address formed by microprocessor 212 to fetch instructions is referred to as the "instruction fetch address". Additionally, the term "data address" refers to the address formed by microprocessor 212 to transfer data. Instruction fetch and data addresses are translated by microprocessor 212 prior to presentation upon CPU bus 222. It is noted that instructions and data are typically placed into main memory 216 by an I/O device 220 such as a disk drive.

External cache 214 is a relatively small (as compared to main memory 216) cache memory configured to store instructions and data previously accessed by microprocessor 212. Generally speaking, accesses to external cache 214 may be performed in substantially less time than accesses to main memory 216. In one embodiment, external cache 214 comprises at least one static random access memory (SRAM) and a cache controller configured to manage the storage of data within the SRAM. External cache 214 may be configured to be a write through cache, in which any updates to data stored within the cache are also performed to main memory 216 at substantially the same time. Alternatively, external cache 214 may be configured to be a store-in or copyback cache in which updates to data stored within the cache are performed to main memory 216 in a delayed fashion. The updates are performed when the associated cache line is discarded from external cache 214. In yet another embodiment, external cache 214 may be configured to be write through or copyback on a line-by-line basis. It is noted that external cache 214 is an optional component. If external cache 214 is not included within an embodiment of computer system 210, then microprocessor 212 is coupled directly to system bus 224.

As previously mentioned, main memory 216 is configured to store instructions and data for use by microprocessor 212. Additionally, main memory 216 stores address translation information used by microprocessor 212 to translate virtual addresses to physical addresses. The format and storage locations of the address translation information are defined by the microprocessor architecture employed by microprocessor 212. In one embodiment, main memory 216 comprises at least one dynamic random access memory (DRAM) and a DRAM controller.

Bus bridge 218 is configured to effect communications between I/O devices 220, main memory 216, and microprocessor 212. It is noted that system bus 224 and CPU bus 222 are typically high bandwidth, high speed buses to allow large amounts of data to be transferred between microprocessor 212, external cache 214, and main memory 216. I/O devices 220 are typically devices which do not require such high bandwidth, and may not be capable of the high frequency switching of system bus 224 and CPU bus 222. Bus bridge 218 therefore provides a buffer between I/O bus 226 (typically a lower speed, lower bandwidth bus than system bus 224 and CPU bus 222) and system bus 224. Additionally, system bus 224 and CPU bus 222 may employ a different bus protocol than I/O bus 226. Bus bridge 218 provides a translation between the different protocols. In one embodiment, I/O bus 226 is a Peripheral Component Interconnect (PCI) bus. In another embodiment, I/O bus 226 is an Industry Standard Architecture (ISA) bus. In still another embodiment, I/O bus 226 is an Enhanced ISA (EISA) bus. Different embodiments of bus bridge 218 may be used for the different embodiments of I/O bus 226. Additional bus bridges similar to bus bridge 218 may be attached to system bus 224 and/or I/O bus 226.

I/O devices 220 are configured to effect communications between computer system 210 and other devices coupled thereto. For example, I/O devices 220 may include a serial or parallel card for connecting devices such as printers or external modems to computer system 210. Additional I/O devices 220 may include a modem, a sound card, a network adapter, etc. I/O devices 220 typically include at least one storage device as well. Storage devices may be hard disk drives, floppy disk drives, and compact disk, read-only-memory (CD-ROM) drives. It is noted that I/O devices 220 may also be referred to as peripheral devices.

It is noted that CPU bus 222 and system bus 224 may be configured according to the same bus protocol or, alternatively, to different bus protocols. Many varied bus protocols are well known, and any bus protocol may be suitable for CPU bus 222 and system bus 224. It is further noted that, although FIG. 4 shows a computer system 210 including a single microprocessor 212, other embodiments of computer system 210 including multiple processors are contemplated. Such embodiment may include multiple processors coupled to an external cache, multiple processors coupled to multiple external caches, or multiple processors coupled to system bus 224.

For simplicity of the following discussion, information may be referred to as being stored in main memory 216.

However, it is understood that a variety of caches similar to external cache 214 may store the information as well. Caches internal to microprocessor 212 may additionally store such information. The information may be accessed from these locations as well.

Figure 5:
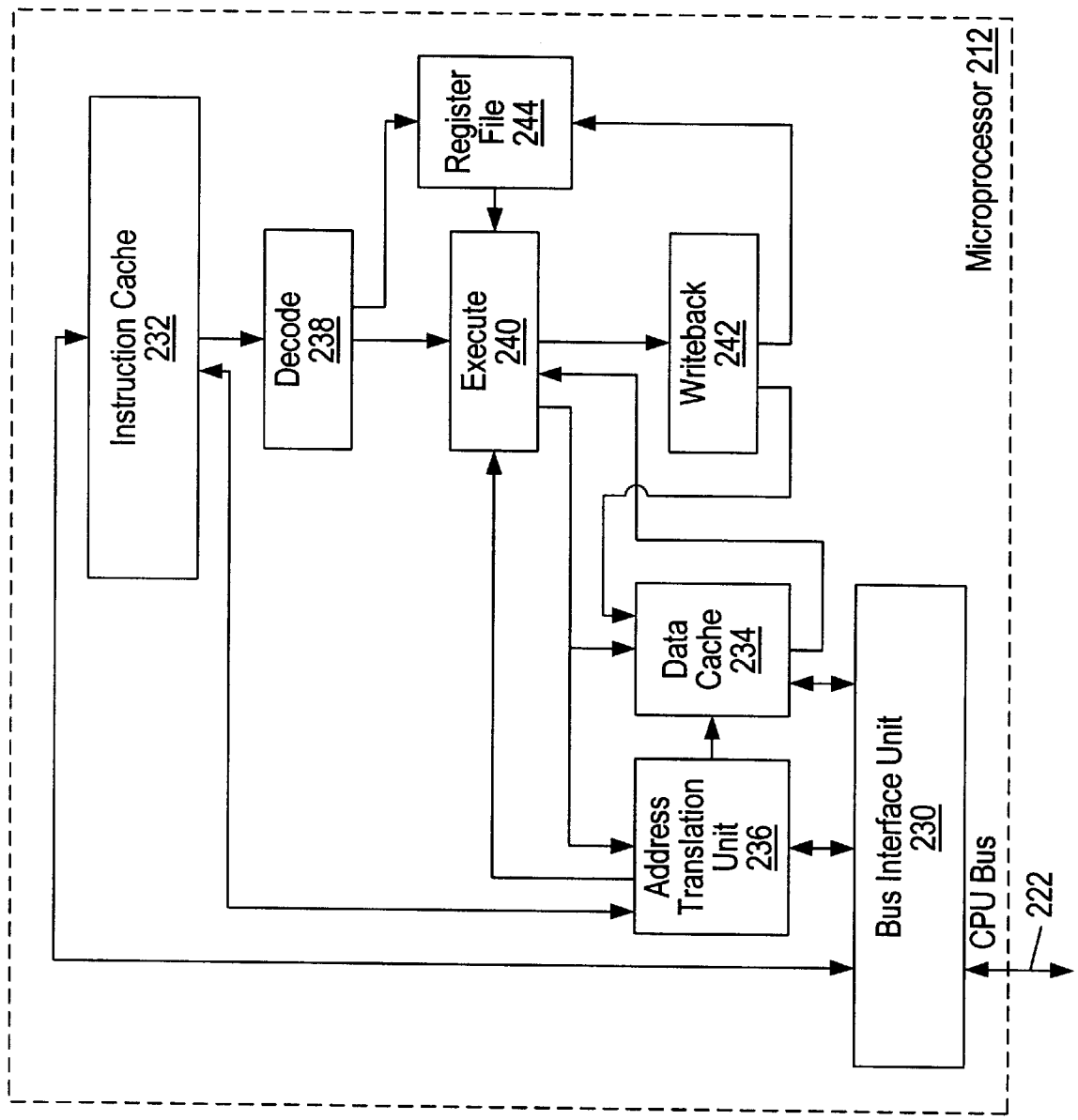
FIG. 5 is a block diagram illustrating portions of the microprocessor of FIG. 4.

Turning now to FIG. 5, an embodiment of extended register set microprocessor 212 is shown in greater detail. Microprocessor 212 includes a bus interface unit 230 coupled to an instruction cache 232, a data cache 234, and an address translation unit 236. Microprocessor 212 includes an instruction processing pipeline comprising a decode stage 238, an execute stage 240, and a writeback stage 242. Additionally, a register file 244 is included for storing registers defined by the instruction set architecture employed by microprocessor 212. Address translation unit 236 is coupled to instruction cache 232, data cache 234, and execute stage 240. Data cache 234 is additionally coupled to execute stage 240 and write back stage 242. Register file 244 is coupled to decode stage 238, execute stage 240, and writeback stage 242. Finally, instruction cache 232, decode stage 238, execute stage 240, and writeback stage 242 are serially connected.

Generally speaking, instructions are fetched from instruction cache 232 and decoded by decode stage 238. Register operands are detected by decode stage 238, and appropriate register operand values are requested from register file 244. Register file 244 conveys the requested values to execute stage 240. During the same clock cycle, the decoded instruction is transferred from decode stage 238 to execute stage 240. In this manner, the instruction and its operands typically are provided to execute stage 240 during the same clock cycle. Execute stage 240 executes the instruction, including forming data addresses for memory operands and transmitting the data addresses to data cache 234 and address translation unit 236. Memory operands operated upon by the instruction are returned to execute stage 240 for continued instruction operation. The result of executing the instruction is stored into a destination operand by writeback stage 242. If an instruction utilizes the result of a previous instruction which is in writeback stage 242 or execute stage 240 when the instruction is in execute stage 240 or decode stage 238, then the result of the previous instruction may be forwarded to the instruction directly. Such a forwarding structure may eliminate the pipeline stalls associated with such instruction dependencies when all operands are read from register file 244.

Address translation unit 236 is configured to translate instruction fetch addresses and data addresses from a virtual address to a physical address. Address translation information, stored in main memory, may be transferred to address translation unit 236 from main memory 216 in order to effect the translation. In the embodiment shown in 25 FIG. 5, address translation unit 236 is accessed by data addresses prior to accessing data cache 234. Address translation unit 236 provides the translated address to data cache 234 for use in determining if the requested data is stored in data cache 234. Instruction cache 232 transmits a virtual instruction fetch address to address translation unit 236 and uses the translated instruction fetch address similarly. If an address may not be translated by information stored within address translation unit 236, then the respective cache access is stalled until the translation may be performed. If no translation information is available to correctly translate the address, than an exception is signaled to the requesting unit. An exception causes instruction execution to begin at an exception address. The exception routine stored at the exception address may attempt to create address translation information for the address, for example.

Address translation unit 236 may include one or more translation storages for storing address translation information. A translation storage includes a plurality of storage locations for storing address translation information. By storing address translation information within address translation unit 236, address translation may be performed more efficiently. Without translation storage, each address translation would involve a bus transaction upon CPU bus 222 to collect the address translation information. More than one bus transaction may be involved, depending upon the format and location of the address translation information.

When address translation unit 236 includes a translation storage, instructions which modify translation information are detected by address translation unit 236 in order to maintain coherency between the information stored in the translation storage and the information stored in main memory 216. If modification occurs, address translation unit 236 discards at least the affected information. During a subsequent address translation utilizing the affected information, the information is transferred from main memory 216.

Instruction cache 232 is a high speed cache memory for storing instructions prior to their execution by microprocessor 212A. It is noted that instruction cache 232 may be configured into a set associative, direct-mapped, or fully associative configuration. Instruction cache 232 additionally includes an instruction fetching mechanism configured to fetch instructions from instruction cache 232 according to the instruction fetch address. The instruction fetch address may be the address indicative of the next instruction to be fetched, or may be a branch prediction address formed via prediction of the target and direction of a branch instruction. The branch prediction mechanism may also be included within instruction cache 232. Many suitable branch prediction mechanisms are well known. The instruction fetch address may further be affected by the detection of an exception, in which case the instruction fetch address is the exception address. Instructions fetched from instruction cache 232 are transferred to decode stage 238 for decoding and execution as described above.

Instruction cache 232 transfers the instruction fetch address to address translation unit 236 prior to accessing the instruction storage, according to the embodiment of FIG. 5. The physical address returned is used to access instruction cache 232. If one of the address tags stored within instruction cache 232 and the physical address compare equal, then the associated instructions are stored at the address in main memory 216 corresponding to the instruction fetch address. The associated instructions may therefore be sent to decode stage 238 for decoding and execution. Instruction cache 232 is referred to as a physically addressed cache, since the addresses associated with the instructions stored therein are physical addresses.

It is noted that instruction cache 232 may be configured not to access address translation unit 236 during each instruction fetch. Instead, instruction cache 232 may fetch instructions from addresses having the same translation as a previous address. For such an embodiment, information indicative of a range of virtual addresses which may be translated with the same translation information as a particular instruction fetch address is conveyed to instruction cache 232 along with the translation of the particular instruction fetch address. If a subsequent fetch address falls within the range of virtual addresses, then the address translation may be formed by instruction cache 232.

Additionally transferred from address translation unit 236 to instruction cache 232 during a virtual to physical address translation is a default operand and addressing mode translation attribute. In one embodiment, the default operand and addressing mode translation attribute is indicative of either a 16 bit, 32 bit, or 64 bit operand and addressing mode. Operands and data addresses for instructions residing at the instruction fetch address include the number of bits specified by the operand and addressing mode translation attribute. For example, in 64 bit operand and addressing mode, 64 bit register values are accessed within register file 244. Additionally, 64 bit addresses are formed for accessing data cache 234 and 64 bit memory operands are accessed. Each instruction transferred to decode stage 238 includes the default operand or addressing mode translation attributes, such that the appropriately sized operands and addresses are formed. In one embodiment, the default operand and addressing mode translation attribute comprises a pair of bits. The pair of bits may be encoded to indicate each of the possible operand and addressing modes. It is noted that register file 244 stores 64 bit register quantities. However, register file 244 may access an 8 bit, 16 bit, or 32 bit portion of a register quantity dependent upon the operand and addressing mode associated with a particular instruction.

Upon decode of an instruction within decode stage 238, the default operand and addressing mode may be overridden. Certain instructions may be defined to access a particular size of operands or to generate a particular size address. Changing the default operand and addressing mode for these instructions enables compatibility with previous software which may not operate correctly using larger operands and addresses. In one embodiment, the operand and addressing mode is overridden via an instruction field. An instruction field is a portion of an instruction comprising at least one bit. Instructions typically include instruction fields which comprise an opcode field and one or more operand fields. Instructions may additionally encode a displacement field which includes a constant value for use in address generation and an immediate field which includes a constant value for use by the instruction. Additionally, an instruction field may be included which changes the operand and addressing mode for the instruction to a particular operand and addressing mode, regardless of the default operand and addressing mode. An instruction which overrides the default operand and addressing mode changes the default operand and addressing mode for that instruction only. Subsequent instructions utilize the default operand and addressing mode defined by address translation unit 236 unless the subsequent instructions include similar address and operand mode override instruction fields.

Data cache 234 is a high speed cache memory for storing data accessed by the instructions executed by microprocessor 212A. It is understood that data cache 234 may employ a set associative or direct mapped configuration. Similar to instruction cache 232, data cache 234 is physically addressed and therefore receives the physical address from address translation unit 236 to determine if requested data is stored within data cache 234.

Both data cache 234 and instruction cache 232 may determine that requested data or instructions are not currently stored in the cache. Bus interface unit 230 is configured to communicate upon CPU bus 222 in order to transfer instructions and data to the respective caches. Additionally, bus interface unit 230 may transfer address translation information from main memory to address translation unit 236. Address translation unit 236 may request address translation information if a particular address cannot be translated according to address translation information stored within the address translation unit. Furthermore, address translation unit 236 may request address translation information if an instruction is executed which changes address translation information.

It is noted that, although decode stage 238, execute stage 240, and writeback stage 242 are shown as individual stages in FIG. 5, each stage may include multiple substages. The stages employed by a particular microprocessor are defined according to the design of the microprocessor, the microprocessor architecture employed by the microprocessor, and the desired clock cycle time. Other factors may be considered as well.

It is further noted that address translation unit 236 may be accessed in parallel with data cache 234 and instruction cache 232. Embodiments of microprocessor 212 with allow such access may include an address translation mechanism in which a number of address bits are defined to be unchanged by the translation. These unchanged address bits may be used to index into the cache, and then the translated address is compared to one or more address tags to determine if the cache stores the bytes corresponding to the translated address. Other embodiments of microprocessor 212 may include an address translation structure which does not define address bits which are unchanged by the translation (i.e. the x86 microprocessor architectures segmentation mechanism). The index into the cache is performed with the untranslated address, and if the index bits are actually changed by the translation than the access is abandoned and an access using the translated address is performed.

Additional information regarding microprocessors may be found within the commonly assigned, co-pending patent application entitled "High Performance Superscalar Microprocessor", Ser. No. 08/146,382, filed Oct. 29, 1993 by Witt, et al. Further information regarding microprocessors may be found within the commonly assigned, co-pending patent application entitled "Superscalar Microprocessor Including a High Performance Instruction Alignment Unit", Ser. No. 08/377843, filed Jan. 25, 1995 by Witt, et al. The disclosures of these patent applications are incorporated herein by reference in their entirety.

Figure 6:
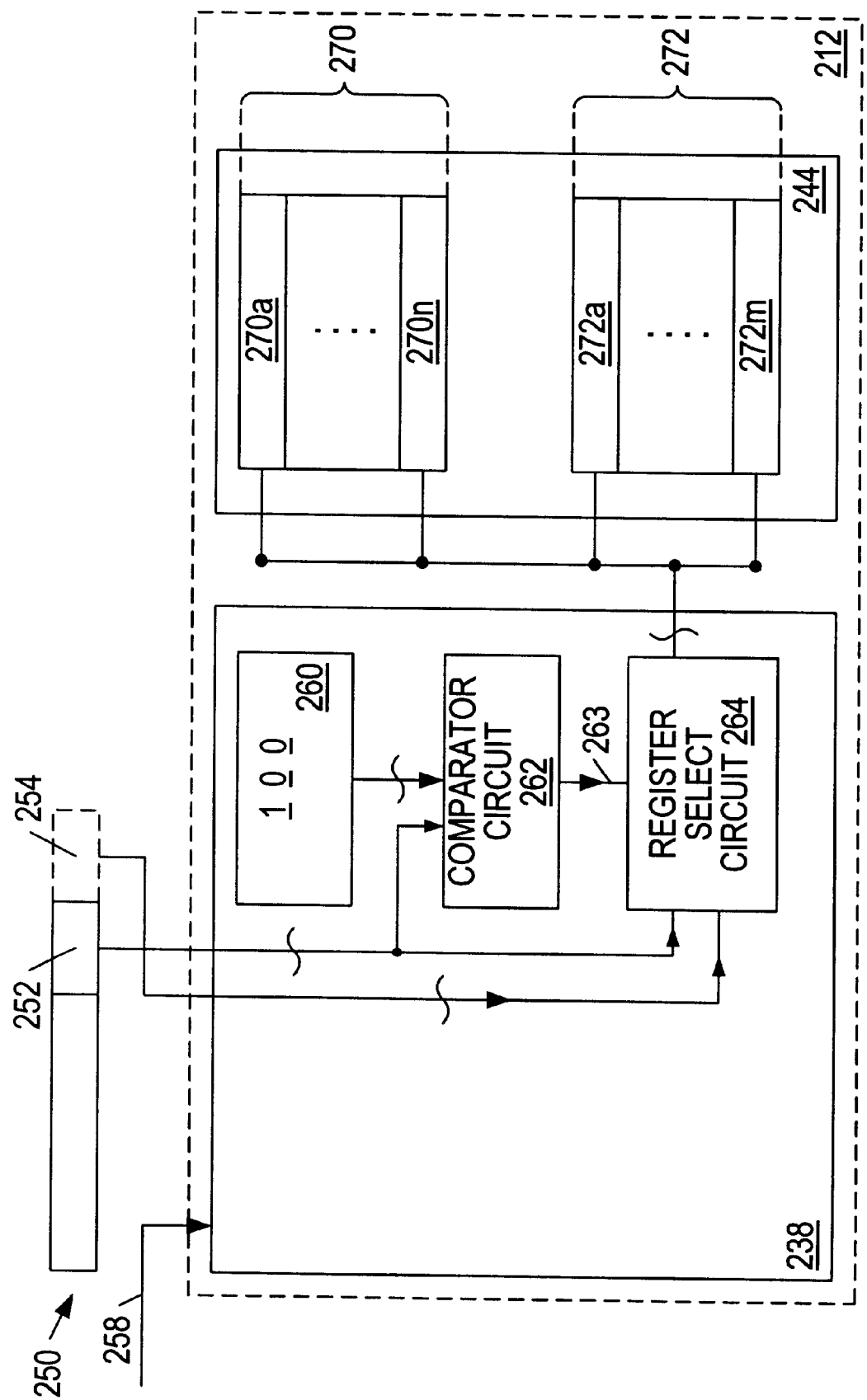
FIG. 6 is a block diagram of the microprocessor of FIG. 5 showing additional detail of an instruction decode unit and a register file.

Turning now to FIG. 6, a block diagram of microprocessor 212 according to the present invention is shown. In the preferred embodiment, microprocessor 212 includes an instruction decode unit 238 adapted to receive a microprocessor instruction 250. Microprocessor instruction 250 includes an extension register key field 252. Instruction decode unit 238 is configured to access the contents of a selected extension register of an extension register set 272 in response to receiving microprocessor instruction 250 if extension register key field 252 contains an extension register key value. Instruction decode 238 is further adapted to access the contents of a selected standard register of a standard register set 270 in response to receiving microprocessor instruction 250 if the contents of extension register key field 252 equal a value other than the extension register key value. In the embodiment shown in FIG. 6, the value of extension register key field 252 is routed to a comparitor circuit 262. An extension register key value register 260 can be programmed to contain the extension register key value. In the embodiment shown in FIG. 6, the extension register key value register 260 contains an extension register key value of 1-0-0. The contents of extension register key value register 260 are routed to comparitor circuit 262 and compared with the contents of extension register key field 252 of microprocessor instruction 250. If the contents of extension register key field 252 equal the contents of extension register key value register 260, comparitor circuit 262 is configured to produce a positive signal on comparator output 263. If, on the other hand, the contents of extension register key field 252 are not equal to the contest of extension register key value register 260, then comparitor circuit 262 is configured to output a negative signal on comparator output 263. Output signal 263 of comparitor circuit 262 is routed to a register select circuit 264. In addition, the contents of extension register key field 252 are routed to register select circuit 264. In this embodiment, it is contemplated that, when the contents of extension register key field 252 are not equal to the contents of extension register key value register 260, then the bits comprising extension register key field 252 are interpreted as information used to identify a selected standard register of standard register set 270. In the preferred embodiment, the information in extension register key field 252 is used to select the selected standard register of standard register set 270 by indexing standard register set 270. In other words, in the preferred embodiment, the value of extension register key field 252 forms an index into standard register set 270 to identify a selected standard register of standard register set 270 when the contents of the extension register key field 252 do not equal the contents of extension register key value register 260. Microprocessor designers and programmers familiar with x86 architecture and instruction formatting will recognize that the format of microprocessor instruction 250 is similar to the format of an x86 microprocessor instruction. In the typical x86 instruction format, a 1-0-0 value in the r/m field of the microprocessor instruction informs the microprocessor that an additional field (sib byte) will be appended to the microprocessor instruction. It will be further appreciated that the architectural modifications required to a standard x86 microprocessor may be minimized if the extension register key field 252 and the extension register key value are compatible with an analogous field and value of a standard x86 microprocessor. In this embodiment, it is contemplated that extension register key field 252 of microprocessor instruction 250 occupies the least significant 3 bits of the microprocessor instruction byte following the op code byte. A diagram of a microprocessor instruction suitable for use with the present invention is shown in FIG. 7a and is discussed in greater detail below.

As previously mentioned, extension register key field 252 serves as a standard register field of microprocessor instruction 250 if extension register key field 252 contains a value other than the extension register key value. The multiple use of extension register key field 252 beneficially minimizes the length of microprocessor instruction 250. It will be appreciated, however, that when extension register key field 252 contains the extension register key value, the information necessary to select one of the extension registers of extension register set 272 must be stored in additional bit locations of microprocessor instruction 250. FIG. 6 represents this additional information as extension register field 254 shown in dotted outline to indicate that extension register field 254 is appended to microprocessor instruction 250 only when extension register key field 252 contains the extension register key value. Thus, in the preferred embodiment, microprocessor instruction 250 further includes an extension register field 254 when a value of extension register key field 252 is equal to an extension register key value. Furthermore, as shown in FIG. 6, the contents of extension register field 254 are routed to register select circuit 264 along with the contents of extension register key field 252. In this manner. the contents of extension register field 254 (when present) are used to select a selected extension register within extension register set 272 of register file 244. Preferably, the selected register within extension register set 272 is selected by using the information contained in extension register field 254 to index extension register set 272. The presence of an extension register field 254 in some microprocessor instructions 250 (i.e., those microprocessor instructions which contain the extension register key value within extension register key field 252) and the absence of extension register field 254 in other microprocessor instructions (i.e., those instructions in which the extension register key field does not contain the extension register key value) highlight that, in the presently preferred embodiment, instruction decode unit 238 is adapted to receive a variable length microprocessor instruction 250.

In the embodiment shown in FIG. 6, an extension register signal 258 is routed to instruction decode unit 238. In embodiments of the present invention incorporating such a signal, the enabling and disabling of extension register operation may be controlled by altering the state of extension register signal 258. The existence of a large base of application software written in x86 instruction format makes it beneficial to permit this application software base to be executed upon the microprocessor 212 of the present invention without recompilation. By controlling the enabling and disabling of the extension register set with a software controllable signal, one embodiment of the present invention contemplates a microprocessor compatible with existing x86 software but capable, nevertheless, of executing programs written with extension register set capabilities of the present invention. When extension register signal 258 is in a first state, then instruction decode unit 238 operates in the manner described in previous paragraphs with respect to the present invention. In other words, the instruction decode unit compares the contents of extension register key field 252 with an extension register key value and accesses a register from extension register set 272 if the key field contains the key value. If key field 252 does not contain the key value, instruction decode unit 238 accesses a register within the standard register set 270 of register file 244. If instruction signal 258 is in a second state, however, extension register operation is disabled. In one embodiment, microprocessor 212 effectively functions as a standard x86 microprocessor when instruction register signal 258 is in a second state.

In FIG. 6, register file 244 is organized as a standard register set 270 and a separate extension register set 272. An alternative embodiment of register file 244 is shown in FIG. 7c. In the register file 244 shown in FIG. 7c, extension register sets 272 includes standard register set 270. In this embodiment, the standard register set 270 forms the least significant registers of register file 244. Fxtension register set 272 includes all of the registers contained within standard register 270 and the additional register sets shown in FIG. 7c as the registers 272n+1 to register 272m. The embodiment of register file 244 shown in FIG. 7c advantageously minimizes the number of registers required. If, for example, standard register set 270 comprises 8 registers and extension register set 272 includes 32 registers, then 40 registers would be required in the embodiment of register file 244 shown in FIG. 6 whereas only 32 registers, are required to implement the register file architecture shown in FIG. 7c. The architecture of register file 244 shown in FIG. 7c results in a correspondence between the registers of standard register set 270 and the least significant registers of extension register set 272. The correspondence between the registers of standard register set 270 and a portion of the extension register set 272 provides an architecture in which the addressing of extension register set 272 may be accomplished by simply concatenating additional bits onto the standard register reference field used to address standard register set 270.

This concatenation of register addressing bits is implemented in the embodiment of the present invention used with the microprocessor instruction 250 shown in FIG. 7a. A typical microprocessor instruction 250 of the present invention includes a first and a second register reference. In a typical instruction, the first register reference may be the source register providing the information (or the address of the memory location containing the information) that will be manipulated by the particular microprocessor operation. The second register reference provides a target register (or the address of a target memory location) to which the manipulated information will be ultimately stored. In an extended register set microprocessor, it is required that the extension register set is available both as a target or source register and as a destination register. To accommodate the first and second register references and the extension register set, the present invention contemplates that microprocessor instructions which require use of the extension register set will signify the microprocessor with the extension register key field described previously. The instruction decode unit is configured to interpret an additional byte appended to the mod r/m byte of the microprocessor instruction when extension register key field 252 contains the extension register key value. The additional byte appended to the microprocessor instruction contains, in a presently preferred embodiment, a 5 bit field for the second extension register reference and a 2 bit first register field that is concatenated with a three bit first register field of the mod r/m byte of the microprocessor instruction. Turning to FIG. 7a, two bytes of a microprocessor instruction 250 are shown. The first or mod r/m byte of microprocessor instruction 250 includes a two bit mod field, a three bit first register reference field 284, and the extended register key field 252 as described previously. Assuming for purposes of this example that the extension register key value is 1-0-0, then an additional byte is appended to mod r/m byte of microprocessor instruction 250 if extended register key field 252 equals 1-0-0. The additional byte appended to mod r/m byte of microprocessor instruction 250 includes a 5 bit second register reference field 282 and a 2 bit extended first register reference field 200. The two bits of extended first register reference field 280 are appended or concatenated to the 3 bit first standard reference field 284 in the mod r/m byte that the two-bit field 280 forms the most significant bits of the 5-bit concatenated field. The 5 bit second register field 282 contains the information necessary to identify one of the selected extension register sets. It will be appreciated to those skilled in the art of microprocessor architecture and programming that the 3-bit fields associated with the standard register references typically imply a register set comprising a maximum of eight registers whereas the 5 bit field of the extension register set implies a maximum of 32 registers.

Thus, instruction decode unit 238 in one embodiment is configured to receive a microprocessor instruction 250 that includes a first register reference and a second register reference. The first register reference and a second reference are indicative of first and second selected registers respectively. Microprocessor instruction 250 further includes operating mode information that is indicative of whether the instruction decode unit 238 is operating in a standard register mode or an extension register mode. In one embodiment, the operating mode information may simply comprise the extended register key field 252. If the extended register key field 252 contains an extended register key value, then instruction decode unit 238 is operating in an extension register mode and instruction decode unit 238 is configured to access the contents of first and second selected registers in response to receiving the microprocessor instruction 250. The first and second registers are located within the standard register set 270 if the instruction decode unit is operating in a standard register mode whereas the first and second selective registers are located within the extension register set 272 when instruction decode unit 238 is operating in extension register mode.

FIGS. 7a and 7b show differing formats for specific bytes of microprocessor instruction 250 depending upon the operating mode of the instruction decode unit 230. Microprocessor instruction 250, as shown in FIG. 7a, includes a first extension register field 280 and a second extension register field 282 when instruction decode unit 238 is operating in the extension register mode. The instruction decode unit 238 uses first and second extension register fields 280 and 282 to select the first and second selected registers. In one embodiment, instruction decode unit 238 uses the first extension register field 280 and a first standard register field 284 of microprocessor instruction 250 to select the first selected register when the instruction decode unit is operating in the extension register mode. Preferably, instruction decode unit 238 concatenates first extension register field 280 onto first standard register field 284 such that the extension register form the most significant bits of a concatenated register reference. Instruction decode unit 238 uses the concatenated register reference to index extension register set 272 according to the contents of the concatenated register reference. Microprocessor instruction 250, as shown in FIG. 7b include a first standard register reference field 284 and a second standard register reference field 284 and a second standard register reference field 252 when the contents of the second standard register field do not equal the extension register key value. The register reference fields shown in FIG. 7b consist of three bits, which is compatible with a maximum of eight standard registers.

Returning now to FIG. 6, instruction decode unit 238 is adapted to receive microprocessor instruction 250 and an extension register signal 258. The microprocessor instruction includes operating mode information 252 indicative of whether instruction decode unit 238 is operating in a standard register mode or an extension register mode. Microprocessor instruction 252 further includes first and second register references indicative of first and second selected registers respectively. The instruction decode unit 238 is configured to access the contents of the first and second selected registers in response to receiving microprocessor instruction 250. The instruction decode unit 238 accesses the contents of the first and second selective registers from the standard register set 270 when extension register signal 258 is in a first state or when instruction decode unit 238 is operating in a standard register mode. Instruction decode unit 238 accesses the contents of first and second selected registers from extension registers set 272 when instruction decode unit 238 is operating in the extension register mode and the extension registers signal is in a second state.

As will be appreciated to those skilled in x86 architecture, the presence of a 1-0-1 field in the r/m field of the mod r/m byte of a microprocessor instruction (coupled with a 00 in the mod field) signifies a "displacement only addressing". In one embodiment of the present invention, it is contemplated that this special case may be eliminated and the displacement only situation implemented by hard wiring the most significant (e.g. extension register 31 in a 5-bit embodiment of the extension register concept) extension register to 0 0 0. The displacement only addressing mode would then be effectively invoked by using the most significant extension register as the base. This embodiment is represented in FIG. 7c by the presence of dashed 0 in most significant extension register 272m. In other embodiments of the present invention intended to be compatible with existing x86 architecture, instruction decode unit 238 is configured to implement the displacement only case signified by 1-0-1 in the r/m field.

Figure 8:
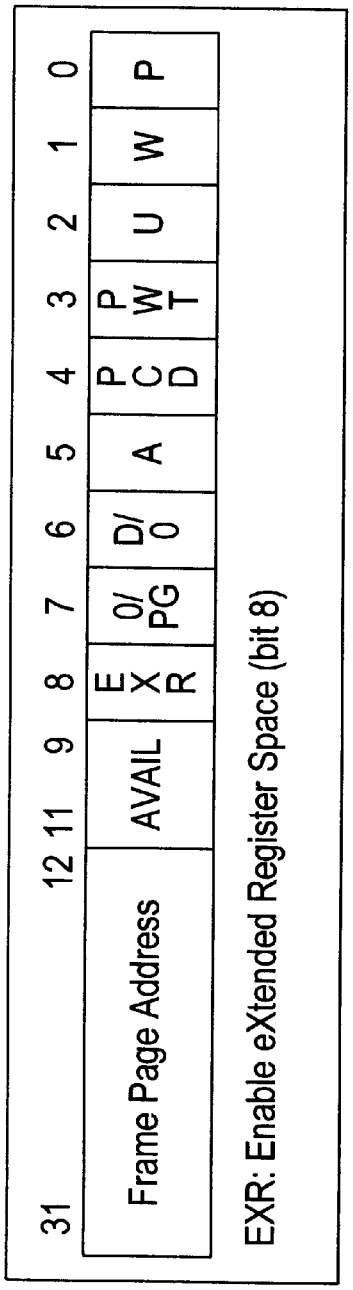
FIG. 8 is a diagram of a page directory/page table entry format suitable for use in an embodiment of the present invention in which the extension registers can be enable or disable with software.
Figure 9:
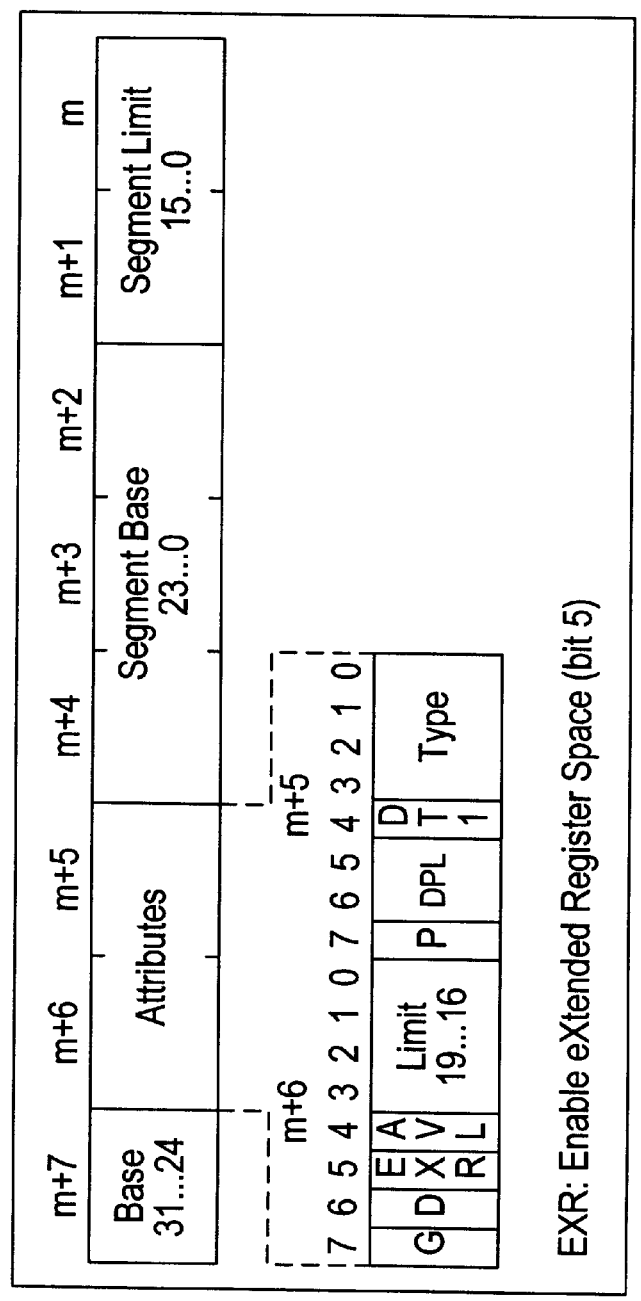
FIG. 9 is a diagram of a memory segment descriptor format suitable for use with an embodiment of the present invention in which the extension registers may be enable or disabled with software.

In one embodiment, extension register signal 258 can be programmed by setting an appropriate bit within either the page table entry, page directory entry, or segment descriptor for the appropriate application program. FIG. 8 shows a diagram of a page directory/page table entry format. One embodiment of the present invention contemplates that the instruction decode unit reads bit 8 of the current page directory/page table entry to determine if the instruction decode unit is operating in an extension register mode. If bit 8 is set, then the instruction decode unit utilizes the extension register set when the extension register key value is found within the extension register key word of the microprocessor instruction. Similarly with respect to FIG. 9, one embodiment of the present invention contemplates that the instruction decode unit interprets bit 5 of byte 6 of the segment descriptor to determine if the currently executing segment is an extension register segment. If so, then the instruction decode unit utilizes the extension register set if the extension register key field of the microprocessor instruction contains the extension register key value as described previously. In yet another embodiment, a bit in the EFLAGS register may be used to program extension register signal 258. The EFLAGS register is an architected register in the x86 architecture used to store flag information as well as various status bits.

What is claimed is:

1. A microprocessor comprising:
    a register file, wherein said register file includes a standard register set comprising a plurality of standard registers and an extension register set comprising a plurality of extension registers; and
    an instruction decode circuit adapted to receive a microprocessor instruction, wherein said microprocessor instruction includes an extension register key field, and further wherein said instruction decode circuit is configured to access the contents of a selected extension register of said extension register set in response to receiving said microprocessor instruction if said extension register key field contains an extension register key value, and wherein said instruction decode circuit is further configured to access the contents of a selected standard register of said standard register set in response to receiving said microprocessor instruction if the contents of said extension register key field equal a value other than said extension register key value;
    wherein said extension register key field of said microprocessor instruction serves as a standard register field if said extension register key field contains a value other than said extension register key value, wherein said instruction decode circuit is configured to use the contents of said standard register field to select said selected standard registers and wherein said instruction decode unit selects said selected standard register by indexing said standard register set according to the contents of said standard register field.

2. The microprocessor of claim 1, wherein a length of said microprocessor instruction is variable.

3. The microprocessor of claim 1, wherein said microprocessor instruction further includes an extension register field when said value of said extension register key field equals said extension register key value, and wherein said instruction decode unit uses the contents of said extension register field to select said selected extension register.

4. The microprocessor of claim 3, wherein said instruction decode unit selects said selected extension register by indexing said extension register set according to the contents of said extension register field.

5. A microprocessor comprising:
    a register file, wherein said register file includes a standard register set comprising a plurality of standard registers and an extension register set comprising a plurality of extension registers; and
    an instruction decode unit adapted to receive a microprocessor instruction, wherein said microprocessor instruction includes operating mode information indicative of whether said instruction decode unit is operating in a standard register mode or an extension register mode and wherein said microprocessor instruction further includes first and second register references indicative of first and second selected registers respectively, and wherein said instruction decode unit is configured to access the contents of said first and second selected registers in response to receiving said microprocessor instruction, and further wherein said first and second selected registers are located within said standard register set when said instruction decode unit is operating in a standard register mode and are located within said extension register set when said instruction decode unit is operating in said extension register model;
    wherein said instruction decode unit is configured to access the contents of said first and second selected registers by indexing said standard register set using said first and second register references, respectively, when said instruction decode unit is operating in said standard register mode.

6. The microprocessor of claim 5 wherein said operating mode information comprises an extension register key field of said microprocessor instruction and wherein said instruction decode unit is configured to operate in said extension register mode if the contents of said extension register key field equal an extension register key value.

7. The microprocessor of claim 6, wherein said contents of said extension register key field comprise said second register reference when said contents of said extension key field are not equal to said extension register key value.

8. The microprocessor of claim 5, wherein said microprocessor instruction further includes first and second extension register fields when said instruction decode unit is operating in said extension register mode and wherein said instruction decode unit uses said first and second extension register fields to select said first and second selected registers.

9. The microprocessor of claim 8, wherein said instruction decode unit uses said first extension register field and a first standard register field of said microprocessor instruction, when said instruction decode unit is operating in said extension register mode, to select said first selected register.

10. The microprocessor of claim 9, wherein said instruction decode unit concatenates said first extension register field onto said first standard register field wherein said contents of said first extension register field form the most significant bits of a concatenated register reference and the contents of said first standard register field form the least significant bits of said concatenated register reference, and further wherein said instruction decode unit selects said first selected register by indexing said extension register set according to said concatenated register reference.

11. The microprocessor of claim 5, wherein said extended register set comprises said standard register set.

12. The microprocessor of claim 5, wherein said instruction decode unit is adapted to receive an extension register signal, wherein said instruction decode unit accesses said contents of said first and second selected registers from said standard register set when (a) said extension register signal is in a first state or (b) said instruction decode unit is operating in a standard register mode, and wherein said instruction decode unit accesses said contents of said first and second selected register from said extension register set when (a) said instruction decode unit is operating in said extension register mode and (b) said extension register signal is in a second state.

13. The microprocessor of claim 12, wherein said operating mode information comprises an extension register key field of said microprocessor instruction and wherein said instruction decode unit is configured to operate in said extension register mode if the contents of said extension register key field equal an extension register key value.

14. The microprocessor of claim 13, wherein said contents of said extension register key field comprise said second register reference when said contents of said extension key field are not equal to said extension register key value.

15. The microprocessor of claim 12, wherein said microprocessor instruction further includes first and second extension register fields when said instruction decode unit is operating in said extension register mode and wherein said instruction decode unit uses said first and second extension register fields to select said first and second selected registers.

16. A method of decoding computer instructions comprising:
  receiving a microprocessor instruction, wherein said microprocessor instruction includes an extension register key field;
  selecting a register from an extension register set of a register file in response to receiving said microprocessor instruction if said extension register key field contains an extension register key value;
  selecting a register from a standard register set of a register file in response to receiving said microprocessor instruction if said extension register key field contains a value other than said extension register key value; and
  accessing the contents of said selected register;
  wherein the step of selecting said register from said extension register set comprises indexing said extension register set according to an extension register field of said microprocessor instruction and further wherein the step of selecting said register from said standard register set comprises indexing said standard register set according to a standard register field of said microprocessor instruction.

17. The method of claim 16, wherein said standard register field comprises said extension register key field when said value of said extension register key field contains a value other than said extension register key value.

18. A computer system, comprising:
  a microprocessor including:
    a register file, wherein said register file includes a standard register set comprising a plurality of standard registers and an extension register set comprising a plurality of extension registers; and
    an instruction decode circuit adapted to receive a microprocessor instruction, wherein said microprocessor instruction includes an extension register key field, and further wherein said instruction decode circuit is configured to access the contents of a selected extension register of said extension register set in response to receiving said microprocessor instruction if said extension register key field contains an extension register key value, and wherein said instruction decode circuit is further configured to access the contents of a selected standard register of said standard register set in response to receiving said microprocessor instruction if the contents of said extension register key field equal a value other than said extension register key value;
    wherein said microprocessor instruction further includes an extension register field when said value of said extension register key field equals said extension register key value, wherein said instruction decode unit uses the contents of said extension register field to select said selected extension register, and wherein said instruction decode unit selects said selected extension register by indexing said extension register set according to the contents of said extension register field;
  an input/output (I/O) device coupled to said microprocessor and to another computer system, wherein said I/O device is configured to communicate between said microprocessor and said another computer system.

19. The computer system as recited in claim 18, wherein said I/O device comprises a modem.

20. A microprocessor comprising:
  a register file, wherein said register file includes a standard register set comprising a plurality of standard registers and an extension register set comprising a plurality of extension registers; and
  an instruction decode circuit adapted to receive a microprocessor instruction, wherein said microprocessor instruction includes an extension register key field, and farther wherein said instruction decode circuit is configured to access the contents of a selected extension register of said extension register set in response to receiving said microprocessor instruction if said extension register key field contains an extension register key value, and wherein said instruction decode circuit is further configured to access the contents of a selected standard register of said standard register set in response to receiving said microprocessor instruction if the contents of said extension register key field equal a value other than said extension register key value;
  wherein said microprocessor instruction further includes an extension register field when said value of said extension register key field equals said extension register key value, wherein said instruction decode unit uses the contents of said extension register field to select said selected extension register, and wherein said instruction decode unit selects said selected extension register by indexing said extension register set according to the contents of said extension register field.

\* \* \* \* \*

UNITED STATES PATENT AND TRADEMARK OFFICE
CERTIFICATE OF CORRECTION

PATENT NO. : 6,014,739
DATED : January 11, 2000
INVENTOR(S) : Daivd S. Christie

It is certified that error appears in the above-identified patent and that said Letters Patent is hereby corrected as shown below:

In the Claims:

Claim 1, col. 15, line 60, after "selected standard" please delete "registers", and insert --register-- in place thereof.

Claim 5, col. 16, line 31, please delete "model;", and insert --mode;-- in place thereof.

Claim 20, col. 18, line 46, please delete "farther", and insert --further-- in place thereof.

Signed and Sealed this

Tenth Day of October, 2000

Attest:

Q. TODD DICKINSON

Attesting Officer

Director of Patents and Trademarks